United States Patent
Wu et al.

(10) Patent No.: US 9,182,862 B2
(45) Date of Patent: Nov. 10, 2015

(54) HIGH NOISE IMMUNITY SENSING METHODS AND APPARATUS FOR A CAPACITIVE TOUCH DEVICE

(71) Applicant: Elan Microelectronics Corporation, Hsinchu (TW)

(72) Inventors: Chia-Mu Wu, Hsinchu (TW); Yi-Chia Hsu, Hengshan Township, Hsinchu County (TW); Jung-Shou Huang, Da-an Shiang (TW); Tung-Ming Yang, Xihu Township, Changhua County (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 273 days.

(21) Appl. No.: 13/799,948

(22) Filed: Mar. 13, 2013

(65) Prior Publication Data

US 2013/0257767 A1    Oct. 3, 2013

(30) Foreign Application Priority Data

Apr. 3, 2012 (TW) ............................ 101111900 A (51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2008/0162996 A1* | 7/2008 | Krah et al. | 714/27 |
| 2009/0251434 A1* | 10/2009 | Rimon et al. | 345/173 |
| 2010/0328239 A1 | 12/2010 | Harada et al. | |
| 2011/0084857 A1 | 4/2011 | Marino et al. | |
| 2011/0298734 A1 | 12/2011 | Ho et al. | |
| 2012/0044192 A1 | 2/2012 | Hsu et al. | |
| 2012/0162124 A1* | 6/2012 | Lin | 345/174 |
| 2013/0127757 A1* | 5/2013 | Mann et al. | 345/173 |
| 2013/0229382 A1* | 9/2013 | Huang et al. | 345/174 |
| 2013/0257767 A1* | 10/2013 | Wu et al. | 345/173 |

* cited by examiner

*Primary Examiner* — Peter Vincent Agustin
(74) *Attorney, Agent, or Firm* — patenttm.us (57) ABSTRACT

High noise immunity sensing methods and apparatus are provided for a capacitive touch device, which sense the capacitive touch device for self capacitance or mutual capacitance or both with different scan frequencies in a frame, to thereby suppress certain frequency noise interference. By combining time domain and space domain noise-eliminating approaches, probabilities of noise interference are reduced, without compromising other parameters.

16 Claims, 8 Drawing Sheets

HIGH NOISE IMMUNITY SENSING METHODS AND APPARATUS FOR A CAPACITIVE TOUCH DEVICE

FIELD OF THE INVENTION

The present invention is related generally to a capacitive touch device and, more particularly, to sensing methods and apparatus for a capacitive touch device.

BACKGROUND OF THE INVENTION

Figure 1:
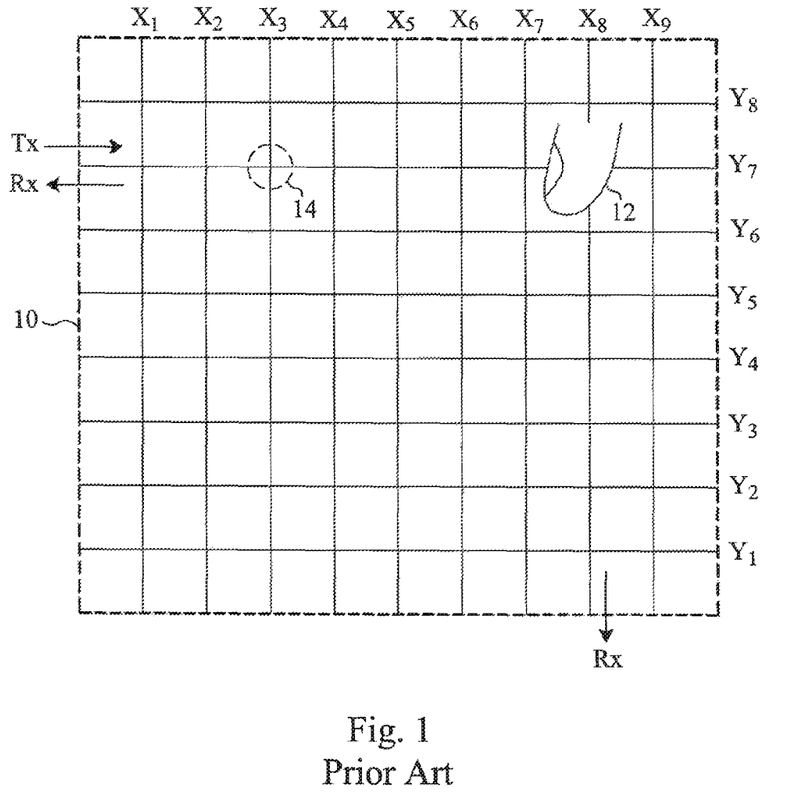
FIG. 1 is a schematic drawing of a capacitive touch sensor.

A capacitive touch device detects a touch point by sensing the capacitive variation of a capacitive touch sensor. For example, referring to FIG. 1, a two-dimension touch sensor 10 has X-direction traces $X_1$-$X_9$ and Y-direction traces $Y_1$-$Y_8$, wherein the traces $X_1$-$X_9$ and $Y_1$-$Y_9$ are not electrically connected to each other. In addition to having their self capacitances, the traces have mutual capacitances therebetween. When contacted by a finger 12, the trace has both of the self capacitance and the mutual capacitance it senses varying. Currently, a sensor structure for the capacitive touch device may use either all point scan or projection scan. The former one is measuring the variations of the mutual capacitances at all trace intersections during a sensing period of a frame, while the latter one is measuring the variations of the self capacitances of all traces during a sensing period of a frame and generating intersecting points by projecting the intersections of the two directions. In sensing the variations of the self capacitances, taking a trace $Y_7$ as an example, an excitation signal Tx is applied to the trace $Y_7$, and a sensed signal Rx fed back by the same trace $Y_7$ is received. The sensed value generated from the sensed signal Rx represents the self capacitance of the trace $Y_7$. When a finger 12 contacts the trace $Y_7$, the ground capacitance of the finger 12 is connected to the self capacitance of the trace $Y_7$ in parallel, so the value now sensed at trace $Y_7$ is different from that obtained when the trace $Y_7$ is untouched. This is therefore a basis for determining whether the trace $Y_7$ is touched. In sensing the mutual capacitance, taking traces $X_8$ and $Y_7$ for example, an excitation signal Tx is applied to the trace $Y_7$ (or $X_8$), and a sensed signal Rx fed back by the corresponding trace $X_8$ (or $Y_7$) is received. The sensed value generated from the sensed signal Rx represents the mutual capacitance between the traces $X_8$ and $Y_7$. When the finger 12 contacts the intersection between the traces $X_8$ and $Y_7$, the ground capacitance of the finger 12 reduces the sensed mutual capacitance, which is a proof of that the intersection of the traces $X_8$ and $Y_7$ are touched.

In sensing process of a capacitive touch sensor, noise interference can bring errors to the sensed value, causing an untouched point to be mistaken as a touched point, or causing the reported coordinates inaccurate, which in turn leads to misoperation. For example, referring to FIG. 1, when a finger 12 touches at a point between the traces $X_7$, $X_8$ and $Y_7$, $Y_8$, the mutual capacitance between the traces $X_7$, $X_8$ and $Y_7$, $Y_8$ or the self capacitance of the trace $X_7$, $X_8$ and $Y_7$, $Y_8$ can be used to calculate the coordinates representing where the finger 12 is. However, if the sensed value is error due to noise interference, the calculated coordinates are deviated from the actual position of the finger 12. If the sensed value of the mutual capacitance between the trace $X_3$ and $Y_7$ or the sensed values of the self capacitances of the traces $X_3$ and $Y_7$ varies over the threshold set by the sensing circuit due to noise interference, the sensing circuit will identify the intersection 14 of the traces $X_3$ and $Y_7$ as another touched point. For eliminating mistakes caused by noise interference, an approach is to use a median filter for filtering signals, yet this can reduce the sensitivity. Another approach is to raise a threshold of the algorithm, but this can make the capacitive touch sensor less supportive to hardware. Yet another approach is to sense the self capacitance or mutual capacitance for several successive times in a frame, and then average the sensed values. For example, referring to the system block diagram of FIG. 2, a capacitive touch panel 16 has a capacitive touch sensor (not shown) connected to a sensing apparatus 18. When a finger or other electrically conductive object touches the capacitive touch panel 16, the capacitance of the capacitive touch sensor changes and this change is sensed by the sensing apparatus 18 and reflected in an output signal So. In the sensing apparatus 18, a control unit 20 controls an excitation unit 22 to apply an excitation signal Tx to the capacitive touch sensor, a sampling unit 24 samples the sensed signal Rx fed back by the capacitive touch sensor, an analog-to-digital converter (ADC) 26 converts the sampled signal Rx into a sensed value Sd, and an averaging unit 28 averages sensed values Sd obtained in a given time period to generate an output signal So. In sensing the same self capacitance or mutual capacitance, referring to FIG. 3, according to one scan frequency, the excitation signal Tx is applied successively for several times and the sensed signal Rx is sampled successively for several times, and one sensed value Sd is obtained in each sensing cycle Ts, while the average of such sensed values Sd is the output signal So. The more times of repeatedly sensing the same self capacitance or mutual capacitance, the smaller the interference caused by noise of a certain frequency to the output signal is, yet the lower the frame rate is, making the response of the capacitive touch device slower and bringing about users' unsmooth operation.

Conventional solutions all compromise other parameters, and therefore it is desired a sensing method and apparatus for suppressing noise interference without compromising other parameters.

SUMMARY OF THE INVENTION

The present invention is directed to high noise immunity sensing methods and apparatus for a capacitive touch device.

According to the present invention, a high noise immunity sensing method for a capacitive touch device uses different scan frequencies to sense self capacitances of different traces in the capacitive touch device in a frame.

According to the present invention, a high noise immunity sensing apparatus for a capacitive touch device includes an excitation unit, a sampling unit and a control unit. The control unit controls the excitation unit and the sampling unit to use different scan frequencies to sense self capacitances of different traces in the capacitive touch device in a frame.

According to the present invention, a high noise immunity sensing method for a capacitive touch device uses different scan frequencies to sense the capacitive touch device for a self capacitance and a mutual capacitance in a frame.

According to the present invention, a high noise immunity sensing apparatus for a capacitive touch device includes an excitation unit, a sampling unit and a control unit. The control unit controls the excitation unit and the sampling unit to use different scan frequencies to sense the capacitive touch device for a self capacitance and a mutual capacitance in a frame.

According to the present invention, a high noise immunity sensing method for a capacitive touch device uses different scan frequencies to sense a self capacitance of a trace in the capacitive touch device in a frame.

According to the present invention, a high noise immunity sensing apparatus for a capacitive touch device includes an excitation unit, a sampling unit and a control unit. The control unit controls the excitation unit and the sampling unit to use different scan frequencies to sense a self capacitance of a trace in the capacitive touch device in a frame.

According to the present invention, a high noise immunity sensing method for a capacitive touch device uses different scan frequencies to sense a mutual capacitance between two traces in the capacitive touch device in a frame.

According to the present invention, a high noise immunity sensing apparatus for a capacitive touch device includes an excitation unit, a sampling unit and a control unit. The control unit controls the excitation unit and the sampling unit to use different scan frequencies to sense a mutual capacitance between two traces in the capacitive touch device in a frame.

By combining time domain and space domain noise-eliminating approaches, theses sensing methods and apparatus can reduce probabilities of noise interference, without compromising other parameters.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 2:
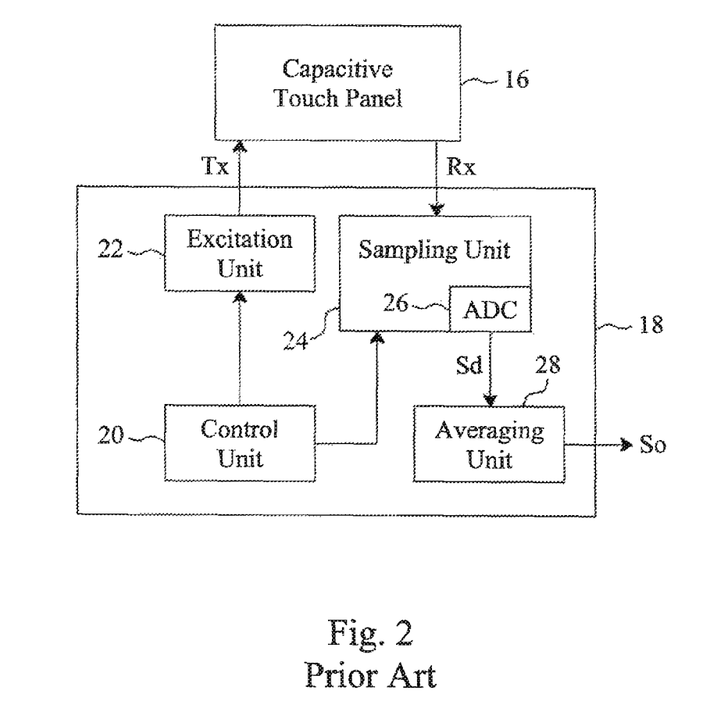
FIG. 2 is a system block diagram of a capacitive touch device.
Figure 3:
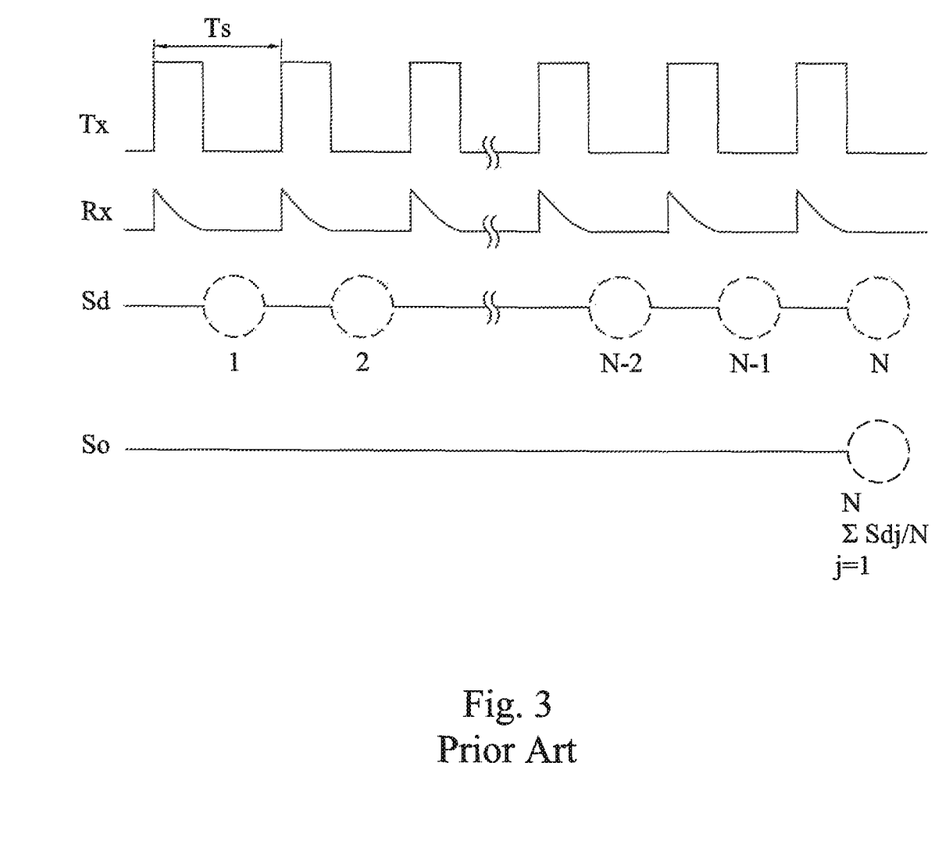
FIG. 3 is a schematic drawing illustrating repeatedly sensing a single self capacitance or mutual capacitance and averaging the sensed values.

The following embodiments may use the sensing apparatus 12 as shown in FIG. 2, but have the control unit 20 to change the scan frequency, so as to control the excitation unit 22 and the sampling unit 24 to apply the excitation signal Tx to the capacitive touch sensor and to sample the sensed signal Rx and to control ADC conversion in various scan frequencies. Thereby, the physical circuit of the sensing apparatus 12 can remain unchanged, and the only affected part is the firmware or software used in the control unit 20, so that the present invention can be applied to capacitive touch devices with various needs by easily changing the instruction set of the control unit 20.

Figure 4:
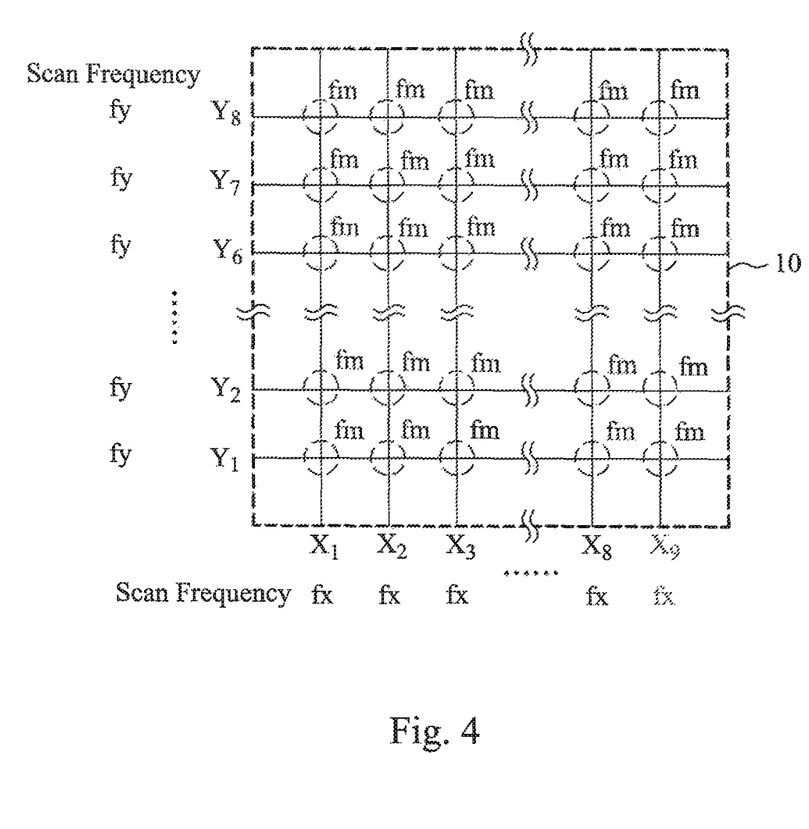
FIG. 4 is a schematic drawing of a first embodiment of the present invention.

In the first embodiment of the present invention, different scan frequencies are used to sense the traces in different directions. For example, referring to FIG. 4, in sensing a frame, a scan frequency fx is used to sense the self capacitances of X-direction traces $X_1$-$X_9$, and a scan frequency fy different from fx is used to sense the self capacitances of Y-direction traces $Y_1$-$Y_8$. To specify, the system uses the scan frequency fx to apply the excitation signal Tx to the X-direction traces $X_1$-$X_9$, and uses the same scan frequency fx to sample the sensed signal Rx fed back by the same X-direction traces $X_1$-$X_9$ and perform ADC conversion. The same is applied to the Y-direction trace $Y_1$-$Y_8$. The system uses another scan frequency fy to apply the excitation signal Tx to the Y-direction trace $Y_1$-$Y_8$, and uses the same scan frequency fy to sample the sensed signal Rx fed back by the same Y-direction trace $Y_1$-$Y_8$ and perform ADC conversion. Thereby, all the self capacitances in a frame can be obtained. Since different scan frequencies fx and fy are used to sensing the self capacitances of the X-direction traces and the self capacitances of the Y-direction traces, noise interference of a certain frequency can be suppressed. Preferably, the present invention further comprises sensing the mutual capacitances between the X-direction traces and Y-direction traces, but using a scan frequency fm different from fx and fy. Taking the case of sensing the mutual capacitance between the traces $X_1$ and $Y_1$ as an example, the system applies the excitation signal Tx to the trace $X_1$ (or $Y_1$) according to the scan frequency fm, and uses the same scan frequency fm to sample the sensed signal Rx fed back by the trace $Y_1$ (or $X_1$) and to perform ADC conversion. In an alternative embodiment, for sensing a frame, the used scan frequencies fx, fy and fm include only two different frequencies, e.g. fx=fm≠fy or fx≠fy=fm. Preferably, after all the self capacitances in a frame is obtained, the self capacitances are used to determine the touched point, and then the mutual capacitance between the traces where the touched point is on is sensed.

The second embodiment of the present invention uses different scan frequencies to sense different traces in the same direction. For example, referring to FIG. 5, different scan frequencies $fx_1$-$fx_9$ are used to sense the self capacitances of the traces $X_1$-$X_9$, respectively, so noise of a certain frequency can interfere at most one trace. In an alternative embodiment, fewer scan frequencies may be used. For example, two scan frequencies $fx_1$ and $fx_2$ are used to sense the self capacitances of the traces $X_1$-$X_4$ and $X_5$-$X_9$, respectively, or two scan frequencies $fx_1$ and $fx_2$ are used to sense the self capacitances of the traces $X_1$, $X_3$, $X_5$, $X_7$, $X_9$ and $X_2$, $X_4$, $X_6$, $X_8$, respectively.

Figure 5:
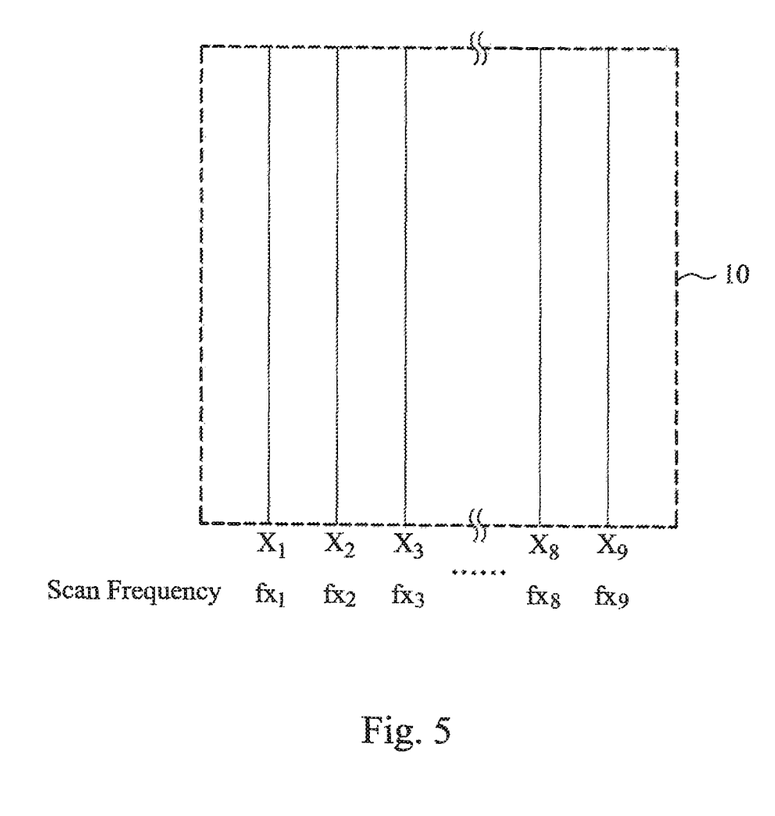
FIG. 5 is a schematic drawing of a second embodiment of the present invention.
Figure 6:
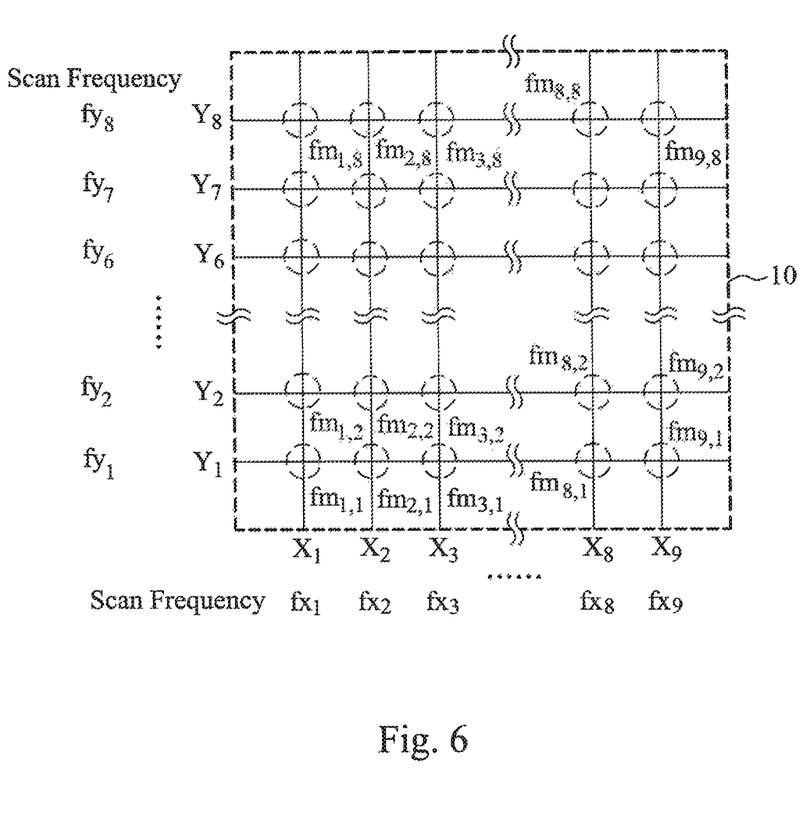
FIG. 6 is a schematic drawing of a third embodiment of the present invention.

By applying the sensing method of the embodiment depicted in FIG. 5 to a two-dimension touch sensor, as shown in FIG. 6, in sensing a frame, different scan frequencies are used to sense the self capacitances of the traces in the same direction and different scan frequencies are used to sense the mutual capacitances between the traces in different directions. More particularly, the different scan frequencies $fx_1$-$fx_9$ are used to sense the self capacitances of the X-direction traces $X_1$-$X_9$, respectively, and the different scan frequencies $fy_1$-$fy_5$ are used to sense the self capacitances of the Y-direction traces $Y_1$-$Y_8$, respectively, while the different scan frequencies $fm_{1,1}$-$fm_{9,8}$ are used to sense the mutual capacitances at the intersections, respectively. In this embodiment, the scan frequencies $fx_1$-$fx_9$, $fy_1$-$fy_8$ and $fm_{1,1}$-$fm_{9,8}$ are all different, so noise interference of a certain frequency is minimized. In an alternative embodiment, fewer scan frequencies may be uses. For example, in sensing a frame, the different scan frequencies $fx_1$-$fx_9$ are used to sense the self capacitances of the X-direction traces $X_1$-$X_9$, respectively, and a single scan frequency fy≠$fx_1$-$fx_9$ is used to sense the self capacitances of the Y-direction traces $Y_1$-$Y_8$. Alternatively, two scan frequencies $fx_1$ and $fx_2$ are used to sense the self capacitances of the X-direction traces, and two scan frequencies $fy_1$ and $fy_2$ are used to sense the self capacitances of the Y-direction traces. Alternatively, different scan frequencies $fm_{1,1}$-$fm_{9,8}$ are used to sense the mutual capacitances of the intersections, and a single scan frequency fx (or fy) is used to sense the self capacitances of the X-direction traces $X_1$-$X_9$ (or Y-direction traces $Y_1$-$Y_8$). Alternatively, the intersections are grouped into two groups, which are sensed in two scan frequencies $fm_1$ and $fm_2$, respectively. Preferably, after all the self capacitances in a frame is obtained, the self capacitances are used to determine the touched point, and then the mutual capacitance between the traces at the touched point is sensed. Preferably, only one scan frequency fm is used to sense the mutual capacitances of the all intersections, wherein the scan frequency fm may be identical to one of the scan frequency for the X-direction traces and the scan frequency for the Y-direction traces, or may be different from the both.

Figure 7:
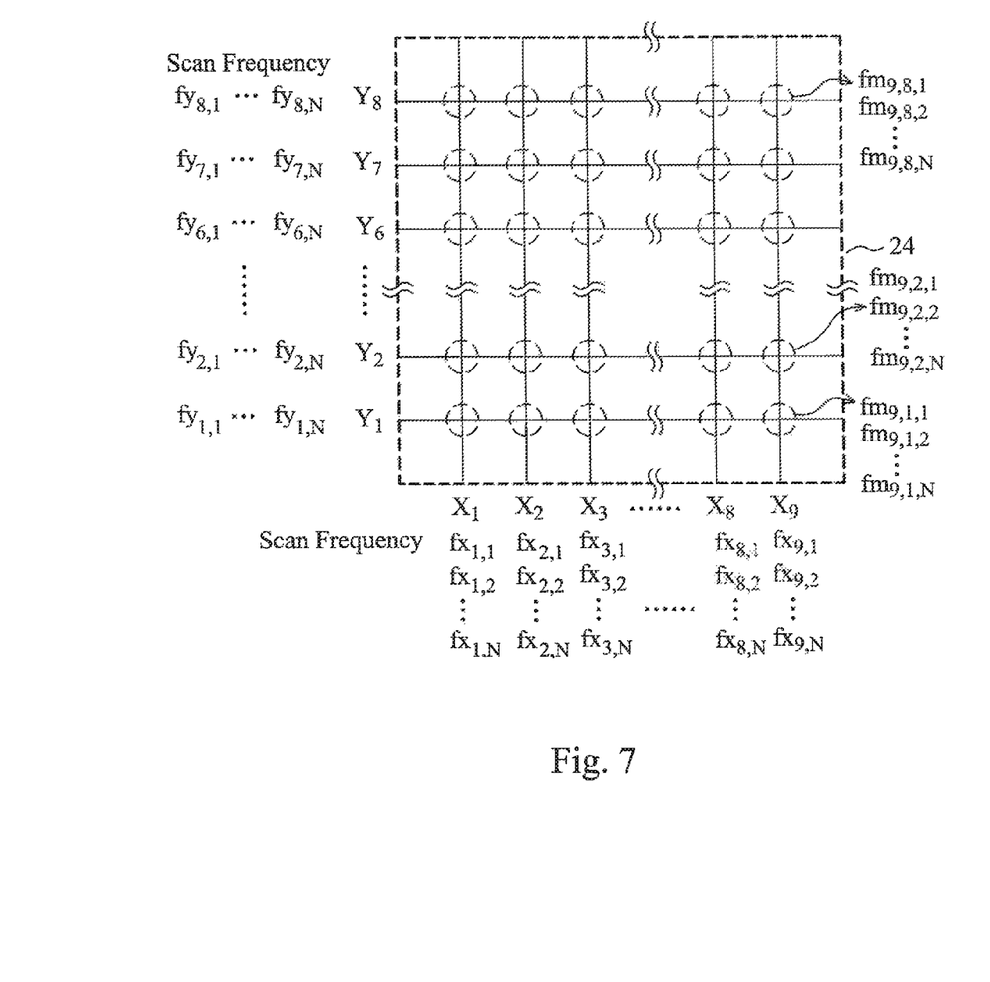
FIG. 7 is a schematic drawing of a fourth embodiment of the present invention.
Figure 8:
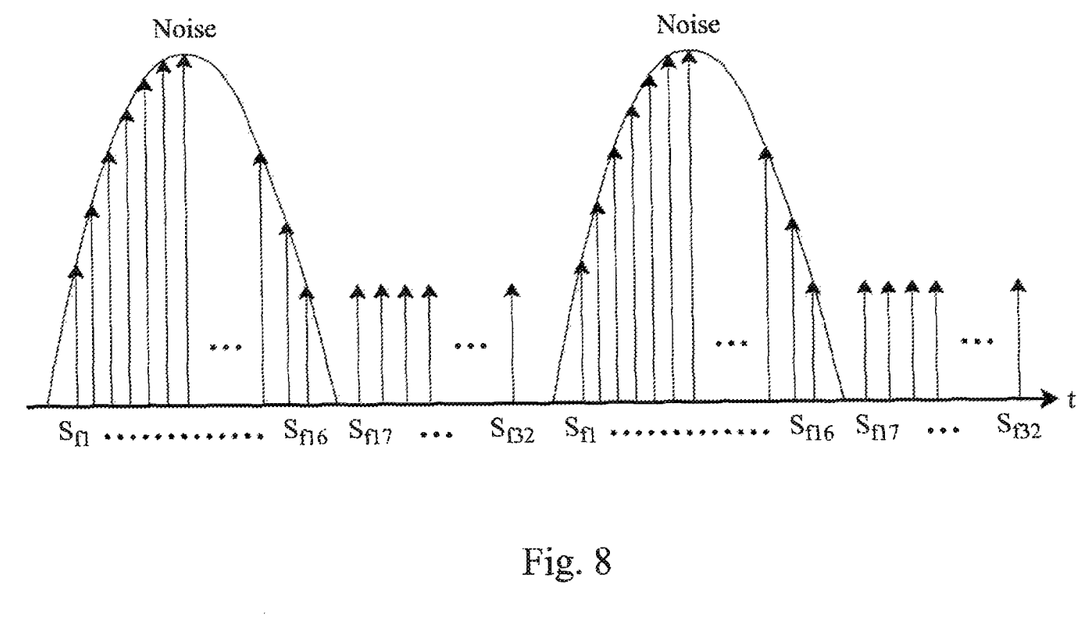
FIG. 8 is a schematic drawing illustrating using different scan frequencies to sense a single self capacitance or mutual capacitance for several times, averaging the sensed values for suppressing noise interference.

The fourth embodiment of the present invention uses different scan frequencies to sense the self capacitance of a single trace or the mutual capacitance between two traces. For example, referring to FIG. 7, each trace is repeatedly sensed for N times for its self capacitance, and each time sensing uses a different scan frequency. Then the sensed values obtained by the different scan frequencies are averaged and taken as the sensed value of this trace, thereby further reducing the incidence of noise interference. Taking the trace $X_1$ for example, the self capacitances of the trace $X_1$ are repeatedly sensed for 32 times to see its variation. Among the 32 times of sensing, 32 different scan frequencies $fx_{1,1}$-$fx_{1,32}$ be used, respectively, or a scan frequency $fx_{1,1}$ may be used for 16 times while another scan frequency $fx_{1,2}$ may be used for the other 16 times, thereby preventing the sensed value of the 32 times of sensing for the trace $X_1$ getting interference from noise of the same frequency. FIG. 8 illustrates how this sensing method reduces noise interference. Since the different scan frequencies are used in 32 repeated sensing cycles, the noise affecting the first 16 times does not affect the latter 16 times of sensing. The same manner can be used to sense the mutual capacitance of an intersection, in which different scan frequencies are used to repeatedly sense the mutual capacitance of a single intersection, and then the obtained sensed values are averaged to generate the sensed value of this intersection. As described in the previous embodiments, in an alternative embodiment, fewer scan frequencies may be used.

As demonstrated in the above embodiments, by combining noise-eliminating approaches working in both time domain and space domain, the incidence of noise interference can be significantly reduced.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A high noise immunity sensing method for a capacitive touch device, the improvement comprising steps of:
   applying a first excitation signal to a first trace in the capacitive touch device with a first scan frequency and sampling a first sensed signal of the first trace to obtain a first self capacitance of the first trace in the capacitive touch device; and
   applying a second excitation signal to a second trace in the capacitive touch device with a second scan frequency and sampling a second sensed signal of the second trace to obtain a second self capacitance of the second trace in the capacitive touch device, wherein the second scan frequency is different from the first scan frequency.

2. The sensing method of claim 1, wherein the first trace and the second trace are selected from a plurality of traces in the same direction.

3. The sensing method of claim 1, wherein the first trace is selected from a plurality of traces in a first direction, and the second trace is selected from a plurality of traces in a second direction which is different from the first direction.

4. The sensing method of claim 3, further comprising sensing a mutual capacitance between the first trace and the second trace with a third scan frequency in the single frame.

5. The sensing method of claim 4, wherein the third scan frequency is different from the first scan frequency.

6. The sensing method of claim 4, wherein the third scan frequency is different from the second scan frequency.

7. A high noise immunity sensing apparatus for a capacitive touch device, comprising:
   an excitation unit applying a first excitation signal to a first trace in the capacitive touch device with a first scan frequency and applying a second excitation signal to a second trace in the capacitive touch device with a second scan frequency, wherein the first scan frequency is different from the second scan frequency;
   a sampling unit sampling a first sensed signal of the first trace and sampling a second sensed signal of the second trace; and
   a control unit connected to the excitation unit and the sampling unit, controlling the excitation unit to apply the first and second excitation signals, and controlling the sampling unit to sample the first and second sensed signals to obtain a first self capacitance of the first trace and a second self capacitance of the second trace in the capacitive touch device.

8. The sensing apparatus of claim 7, wherein the first trace and the second trace are in the same direction.

9. The sensing apparatus of claim 7, wherein the first trace and the second trace are in different directions.

10. The sensing apparatus of claim 9, wherein the control unit further controls the excitation unit and the sampling unit to sense a mutual capacitance between the first trace and the second trace with a third scan frequency in the single frame.

11. The sensing apparatus of claim 10, wherein the third scan frequency is different from the first scan frequency.

12. The sensing apparatus of claim 10, wherein the third scan frequency is different from the second scan frequency.

13. A high noise immunity sensing method for a capacitive touch device, the improvement comprising sensing self capacitances and mutual capacitances from the capacitive touch device with different scan frequencies in a single frame.

14. The sensing method of claim 13, wherein the step of sensing self capacitances and mutual capacitances from the capacitive touch device with different scan frequencies in a single frame comprises:
   sensing a self capacitance of a first trace in the capacitive touch device with a first scan frequency; and
   sensing a mutual capacitance between the first trace and a second trace in the capacitive touch device with a second scan frequency which is different from the first scan frequency.

15. A high noise immunity sensing apparatus for a capacitive touch device, comprising:
   an excitation unit;
   a sampling unit; and
   a control unit connected to the excitation unit and the sampling unit, controlling the excitation unit and the sampling unit to sense self capacitances and mutual capacitances from the capacitive touch device with different scan frequencies in a single frame.

16. The high noise immunity sensing apparatus for a capacitive touch device of claim 15, wherein the excitation unit and the sampling unit are connected to a first trace and a second trace in the capacitive touch device, and in the single frame the control unit controls the excitation unit and the sampling unit to sense a self capacitance of the first trace with a first scan frequency, and a mutual capacitance between the first trace and the second trace with a second scan frequency which is different from the first scan frequency.

* * * * *